(12) United States Patent
Li et al.

(10) Patent No.: US 11,661,534 B2
(45) Date of Patent: May 30, 2023

(54) HOT MELT ADHESIVE COMPOSITION

(71) Applicant: HENKEL AG & CO. KGAA, Duesseldorf (DE)

(72) Inventors: Weiyi Li, Guandong (CN); Minrui Chen, Shanghai (CN)

(73) Assignee: HENKEL AG & CO., KGaA, Duesseldorf (DE)

( * ) Notice: Subject to any disclaimer, the term of this patent is extended or adjusted under 35 U.S.C. 154(b) by 346 days.

(21) Appl. No.: 16/909,634

(22) Filed: Jun. 23, 2020

(65) Prior Publication Data
US 2020/0317970 A1 Oct. 8, 2020

Related U.S. Application Data

(63) Continuation of application No. PCT/CN2017/118488, filed on Dec. 26, 2017.

(51) Int. Cl.
*C09J 153/02* (2006.01)
*C09J 123/08* (2006.01)
*C09J 123/14* (2006.01)

(52) U.S. Cl.
CPC ....... *C09J 123/0815* (2013.01); *C09J 123/14* (2013.01); *C09J 153/025* (2013.01)

(58) Field of Classification Search
CPC ........ C09J 153/02; C09J 2453/00; C09J 5/06; C08L 91/06
USPC .......................................................... 524/505
See application file for complete search history.

(56) References Cited

U.S. PATENT DOCUMENTS

| | | | |
|---|---|---|---|
| 6,329,468 B1 | 12/2001 | Wang | |
| 8,467,359 B2 | 6/2013 | McCann et al. | |
| 8,921,474 B2 | 12/2014 | Alper et al. | |
| 9,771,473 B2 | 9/2017 | Wright et al. | |
| 2015/0017868 A1 | 1/2015 | Stafeil et al. | |
| 2015/0112012 A1 | 4/2015 | Takamori | |
| 2015/0299526 A1 | 10/2015 | Gray et al. | |
| 2016/0102230 A1 | 4/2016 | Gray et al. | |
| 2016/0177141 A1* | 6/2016 | Schroeyers | C09J 123/142 524/505 |
| 2016/0222258 A1* | 8/2016 | Sustic | C08J 3/005 |
| 2016/0272856 A1 | 9/2016 | Mansour et al. | |
| 2018/0066386 A1 | 3/2018 | Ito et al. | |

FOREIGN PATENT DOCUMENTS

| | | |
|---|---|---|
| CN | 1312844 A | 9/2001 |
| CN | 104428380 A | 3/2015 |
| CN | 105283591 A | 1/2016 |
| CN | 107208338 A | 9/2017 |
| JP | H10-168417 A | 6/1998 |
| JP | 2014009255 | 1/2014 |
| JP | 2016530355 | 9/2016 |
| JP | 2016186049 | 10/2016 |
| WO | 0000565 A1 | 1/2000 |
| WO | 2009/064869 A1 | 5/2009 |
| WO | 2015006179 A1 | 1/2015 |
| WO | 2016148174 A1 | 9/2016 |

* cited by examiner

*Primary Examiner* — Hui H Chin
(74) *Attorney, Agent, or Firm* — Sun Hee Lehmann

(57) ABSTRACT

This invention relates to a hot melt adhesive composition. The hot melt adhesive composition according to the present invention comprises at least one hydrogenated thermoplastic block copolymer with a melt index greater than or equal to 30 grams per 10 minutes at 190° C./2.16 kg; and at least one polyolefin with a melt viscosity less than or equal to 2000 cPs at 190° C. The hot melt adhesive composition according to the present invention can be applied at low temperature, has excellent T peel strength and low odor after being applied in the disposable products.

10 Claims, No Drawings

HOT MELT ADHESIVE COMPOSITION

TECHNICAL FIELD OF THE INVENTION

This invention relates to a hot melt adhesive composition. The hot melt adhesive composition according to the present invention comprises at least one hydrogenated thermoplastic block copolymer with a melt index greater than or equal to 30 grams per 10 minutes (g/10 min) at 190° C./2.16 kg; and at least one polyolefin with a melt viscosity less than or equal to 2000 cPs at 190° C. The hot melt adhesive composition according to the present invention can be applied at low temperature, has excellent T peel strength and low odor after being applied in the disposable products.

BACKGROUND OF THE INVENTION

Hot melt adhesives containing a thermoplastic block copolymer as a main component have been widely used in disposable products such as a diaper and a napkin and are applied to a base material, for example, a nonwoven fabric, a tissue, a polyethylene (PE) film and the like. Typical thermoplastic block copolymers used in the traditional hot melt adhesives are styrene-butadiene-styrene (SBS) block copolymers and styrene-isoprene-styrene (SIS) block copolymers.

The traditional hot melt adhesives, however, usually have high melt viscosity. If used at a higher temperature, the hot melt adhesives are likely to burn the PE films or other substrates to be applied on. If used at a lower temperature, the hot melt adhesives often cannot be coated onto the substrates properly.

In addition, it has been shown that together with elastic films, ink, and super adsorbent polymers (SAP), hot melt adhesive is one of the major sources of odor for disposable products. Not only hot melt adhesive itself emits odor when being heated to the application temperature, it also heats up the substrate in contact with the hot melt adhesive which could further release odorous molecules.

Therefore, there is a need for developing a hot melt adhesive that can be applied at low temperature, has excellent T peel strength and low odor after being applied in the disposable products.

SUMMARY OF THE INVENTION

The present invention relates to a hot melt adhesive composition, comprising:
(a) at least one hydrogenated thermoplastic block copolymer with a melt index greater than or equal to 30 grams per 10 minutes (g/10 min) at 190° C./2.16 kg; and
(b) at least one polyolefin with a melt viscosity less than or equal to 2000 cPs at 190° C.

The hot melt adhesive composition of the invention has a small melt viscosity and can be applied at a low temperature range of 130 to 140° C. The hot melt adhesive composition also has excellent T peel strength and low odor after being applied in the disposable products.

The present invention also relates to a hot melt adhesive composition comprising:
(a) at least one hydrogenated thermoplastic block copolymer; and
(b) at least one polyolefin;
wherein the hot melt adhesive composition has a melt viscosity less than or equal to 3000 cPs at 140° C.

The present invention also relates to a hot melt adhesive composition comprising:
(a) at least one hydrogenated thermoplastic block copolymer; and
(b) at least one polyolefin;
wherein the hot melt adhesive composition has an odor score less than 2.3.

The present invention also relates to an article comprising a substrate bonded to the hot melt adhesive composition, the substrate is selected from the group consisting of a woven fabric, a nonwoven fabric, a rubber, a resin, tissues, polyolefin films, elastic films and elastic strands.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "hydrogenated thermoplastic block copolymer" according to the invention means a copolymer of a vinyl-based aromatic hydrocarbon with a conjugated diene, which is fully or partially hydrogenated.

The term "vinyl-based aromatic hydrocarbon" means an aromatic hydrocarbon compound having a vinyl group, and specific examples thereof include styrene, o-methylstyrene, p-methylstyrene, p-tert-butylstyrene, 1,3-dimethylstyrene, a-methylstyrene, vinylnaphthalene, vinylanthracene and the like. The vinyl-based aromatic hydrocarbons can be used alone, or in combination.

The term "conjugated diene" means a diolefin compound having at least a pair of conjugated double bonds, and specific examples thereof include 1,3-butadiene, 2-methyl-1,3-butadiene (or isoprene), 2,3-dimethyl-1,3-butadiene, 1,3-pentadiene, 1,3-hexadiene and the like. The conjugated diene can be used alone, or in combination.

Hydrogenated Thermoplastic Block Copolymer

The hydrogenated thermoplastic block copolymer of the present invention refers to any common hydrogenated thermoplastic block copolymer having a melt index greater than or equal to 30 g/10 min, such as greater than or equal to 45 g/10 min, greater than or equal to 80 g/10 min, greater than or equal to 100 g/10 min, or greater than or equal to 150 g/10 min, determined according to ASTM D-1238 (190° C., 2.16 kg load).

In some embodiments of the present inventions, the hydrogenated thermoplastic block copolymer may have a melt index less than or equal to 2000 g/10 min, such as less than or equal to 1000 g/10 min, less than or equal to 500 g/10 min, less than or equal to 200 g/10 min, or less than or equal to 100 g/10 mins, determined according to ASTM D-1238 (190° C., 2.16 kg load).

The hydrogenated thermoplastic block copolymer includes but not limited to styrene-ethylene-butylene-styrene (SEBS) block copolymer, styrene-ethylene-propylene-styrene (SEPS) block copolymer, styrene-ethylene-ethylene/propylene-styrene (SEEP) block copolymer and any combination thereof.

Commercially available hydrogenated thermoplastic block copolymer is, for example, MD 1648 from Kraton.

In some embodiments of the present invention, the amount of the hydrogenated thermoplastic block copolymer in the hot melt adhesive composition of the invention is from 5% to 25%, and preferably from 10% to 15% by weight based on the total weight of the composition.

Polyolefin

The polyolefin of the present invention refers to any common polyolefin having a melt viscosity less than or equal to 2000 cPs at 190° C., such as less than or equal to 1700 cPs at 190° C., less than or equal to 1500 cPs at 190° C., less than or equal to 1200 cPs at 190° C. or less than or equal to 1000 cPs at 190° C.

In some embodiments of the present invention, the polyolefin may have a melt viscosity greater than or equal to 100 cPs at 190° C., such as greater than or equal to 500 cPs at 190° C., greater than or equal to 800 cPs at 190° C., greater than or equal to 1000 cPs at 190° C., or greater than or equal to 1500 cPs at 190° C.

The polyolefin includes but not limited to polyethylene, polypropylene, polybutene and the copolymers and terpolymers thereof.

Examples of commercially available polyolefin having a melt viscosity less than or equal to 2000 cPs at 190° C. are, for example, Aerafin 17 from Eastman; and RT 2315 from Rextac.

In some embodiments of the present invention, the amount of the polyolefin of the invention is from 15 to 50%, and preferably from 25 to 35% by weight based on the total weight of the composition.

In some embodiments of the present invention, the weight ratio between the hydrogenated thermoplastic block copolymer and the polyolefin is less than or equal to 0.6:1, preferably less than or equal to 0.4:1, more preferably from 0.3:1 to 0.4:1, and even more preferably from 0.33:1 to 0.4:1.

Optional Additives

In some embodiments of the present invention, the hot melt adhesive composition may further optionally include other additives, such as at least one wax, at least one plasticizer, at least one tackifier, at least one antioxidant, at least one pigment, at least one rheology modifier, at least one filler and any combination thereof.

In some embodiments of the present invention, the hot melt adhesive composition may optionally include at least one wax. The wax may be used to reduce the melt viscosity of the hot melt adhesive composition. The wax may be selected from at least one of paraffin waxes, microcrystalline waxes, polyethylene waxes, polypropylene waxes, Fischer-Tropsch waxes, oxidized Fischer-Tropsch waxes and functionalized waxes and fatty amide waxes. Examples of commercially available waxes are, for example, Sasaolwax H1 from Sasol Wax; AC-400 from Honeywell; MC-400 from Marcus Oil Company; Epolene C-18 from Eastman Chemical; and AC-575P from Honeywell.

In some embodiments of the present invention, the hot melt adhesive composition may optionally include at least one plasticizer. The plasticizer is used to decrease the melt viscosity of the hot melt adhesive, impart the flexibility to the hot melt adhesive and improve the wettability of the hot melt adhesive. Preferably, the plasticizer is a paraffin oil, naphthene oil and any combination thereof. Examples of commercially available plasticizers are, for example, KN 4006, KN 4008, and KN 4010 from PetroChina Lubricant Company; LP 150, and LP 350 from Kukdong Oil & Chemicals; and Nyflex 222B from Nynas.

In some embodiments of the present invention, the hot melt adhesive composition may optionally include at least one tackifier. Preferably, the tackifier has a Ring & Ball softening point from 70 to 150° C. The tackifier includes but not limited to aliphatic petroleum resin, cyclic petroleum resin, aromatic petroleum resin, gum resin, rosin ester, synthetic terpene resin, natural terpene resin and any combination thereof. Preferably, the tackifier is fully hydrogenated aliphatic tackifier. Examples of commercially available tackifiers are, for example, C100R, C100W, H130R, and H130W from Eastman; H5-1000 and H5-1001 from Henghe China; SU90, SU100, SU120 and SU130 from Kolon Industries; I-Marv P90, I-Mary P100, and I-Mary P120 from Idemitsu; Regalite R1100, Regalite R1120, and Regalite S1100 from Eastman; JH-6100 and JH-6125 from Jinhai Chengguang.

In some embodiments of the present invention, the hot melt adhesive composition may optionally include at least one antioxidant. The antioxidant includes but not limited to hindered phenol, phosphite, thiodipropionate and any combination thereof. Examples of commercially available antioxidants are, for example, Evernox 10GF and Evernox 1726 from Everspring Chemical; Irganox 1010 and Irganox 1726 from BASF; Thanox 1010G and Thanox 1726 from Rianlon; Everfos 168 from Everspring Chemical; Iragafos 168 from BASF; Thanox 168 from Rianlon; Thanox 412S and Thanox DSTP from Rianlon; ADK AO 412S from Adeka; and Sumilizer TP-D from Sumitomo Chemical.

In some embodiments of the present invention, the hot melt adhesive composition may optionally include at least one pigment. The pigment includes but not limited to titanium oxide, carbon black and any combination thereof.

In some embodiments of the present invention, the hot melt adhesive composition may optionally include at least one rheology modifier. The rheology modifier includes but not limited to fumed silica, polyacrylates and any combination thereof.

In some embodiments of the present invention, the hot melt adhesive composition may optionally include at least one filler. The filler includes but not limited to mica, calcium carbonate, kaolin, talc, silicon dioxide and any combination thereof.

In a preferred embodiment, the hot melt adhesive composition comprises:
(a) from 5 to 25% by weight of at least one hydrogenated thermoplastic block copolymer with a melt index greater than or equal to 30 g/10 min at 190° C./2.16 kg;
(b) from 15 to 50% by weight of at least one polyolefin with a melt viscosity less than or equal to 2000 cPs at 190° C.;
(c) from 5 to 35% by weight of at least one plasticizer;

(d) from 20 to 60% by weight of at least one tackifier; and
(e) from 0.1 to 2% by weight of at least one antioxidant;
the weight percentages of all components add up to 100% by weight.

The hot melt adhesive composition of the present invention may be prepared by mixing the components of the hot melt adhesive composition at high temperature, such as 130 to 150° C., so that all components can be fully melt and well mixed.

The melt viscosity of the hot melt adhesive composition of the present invention may be measured at a desired temperature with a 27 #spindle, and a Brookfield hotmelt viscosity tester.

The hot melt adhesive composition of the present invention preferably has a melt viscosity less than or equal to 3000 cPs at 140° C. In some embodiments, the hot melt adhesive composition preferably has a melt viscosity less than or equal to 3000 cPs at 130° C.

The odor score of the hot melt adhesive composition of the present invention may be determined by the steps of:
a) placing the hot melt adhesive composition in a closed container;
b) heating the container to 160° C. for 2 hours;
c) cooling the container to 25° C.;
d) reheating the container to 70° C. for 1 hour;
e) cooling the container to 25° C.;
f) opening the container and organizing a group of test panel members to smell the odor from the container at a distance of 5 cm from the opening of the container;
g) assigning a score of the hot melt adhesive by each of the test panel member independently according to the rules below:
a hot melt adhesive with no odor is assigned with a score of 1;
a hot melt adhesive with slight but detectable odor is assigned with a score of 2;
a hot melt adhesive with some odor but not strong is assigned with a score of 3;
a hot melt adhesive with strong odor is assigned with a score of 4;
a hot melt adhesive with pungent odor is assigned with a score of 5; and
h) obtaining an average score of the hot melt adhesive from all the test panel members as the odor score for the hot melt adhesive.

The hot melt adhesive composition of the present invention preferably has an odor score lower than 2.3. In some embodiments, the hot melt adhesive composition preferably has an odor score less than or equal to 2.1.

The T peel strength of the hot melt adhesive composition of the present invention may be assessed by the steps of:
a) forming a laminate with two layers bonded by the hot melt adhesive composition at a desired amount at a temperature between 130 to 160° C.;
b) peeling the two layers from one another at an angle of 180°; and
c) recording the force when the two layers were pulled 10 cm apart as the T peel strength of the hot melt adhesive for the two layers.

The hot melt adhesive composition of the present invention preferably has a T peel strength greater than or equal to 2.7 N for adhering PE and non-woven hydrophilic fabric when being applied at 2 gsm. In some embodiments, the hot melt adhesive composition preferably has a T peel strength greater than or equal to 3.6 N for adhering PE and non-woven hydrophilic fabric when being applied at 2 gsm.

The hot melt adhesive composition of the present invention preferably has a T peel strength greater than 2.7 N for adhering PE and non-woven hydrophobic fabric when being applied at 2 gsm. In some embodiments, the hot melt adhesive composition preferably has a T peel strength greater than or equal to 3.3 N for adhering PE and non-woven hydrophobic fabric when being applied at 2 gsm.

The hot melt adhesive composition of the present invention preferably has a T peel strength greater than or equal to 5.8 N for adhering non-woven hydrophilic fabric and non-woven hydrophobic fabric when being applied at 4 gsm. In some embodiments, the hot melt adhesive composition preferably has a T peel strength greater than or equal to 6.5 N for adhering non-woven hydrophilic fabric and non-woven hydrophobic fabric when being applied at 4 gsm.

The hot melt adhesive composition of the present invention preferably has a T peel strength greater than or equal to 1.8 N for adhering PE and tissue when being applied at 1.5 gsm. In some embodiments, the hot melt adhesive composition preferably has a T peel strength greater than or equal to 2.0 N for adhering PE and tissue when being applied at 1.5 gsm.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

Melt Viscosity for Polyolefin

The melt viscosity of polyolefin in the present invention was measured at 190° C. with a 27 #spindle, and a Brookfield hotmelt viscosity tester.

Melt Viscosity for Hot Melt Adhesive Composition

The melt viscosity of hot melt adhesive composition in the present invention was measured in a temperature range from 130 to 140° C. with a 27 #spindle, and a Brookfield hotmelt viscosity tester.

Odor Test

Weighted out 100 grams of hot melt adhesive and placed the hot melt adhesive in a 250 ml glass jar. Covered the glass jar with aluminum foil and heated the glass jar at 160° C. for 2 hours. Took out the glass jar and cooled the glass jar to 25° C. Reheated the glass jar for to 70° C. for 1 hour. Took out the glass jar and cooled the glass jar to 25° C.

Organized a group of five test panel members. The test panel members were selected with no smoking or drinking habits. Each test panel member was given a glass jar containing the identical hot melt adhesive prepared by the method stated above. The test panel member removed the aluminum foil and smelled the odor from the glass jar at a distance of 5 cm from the opening of the glass jar. Each test panel member assigned a score of the odor from the glass jar independently. The average score of the five test panel members was the odor score for the hot melt adhesive.

The rules for the test panel member to assign a score to the hot melt adhesive were:
a hot melt adhesive with no odor was assigned with a score of 1;
a hot melt adhesive with slight but detectable odor was assigned with a score of 2;
a hot melt adhesive with some odor but not strong was assigned with a score of 3;

a hot melt adhesive with strong odor was assigned with a score of 4; and a hot melt adhesive with pungent odor was assigned with a score of 5.

T Peel Test with PE and Non-Woven Hydrophilic Fabric

A PE sheet (Air permeable cast film with a thickness of 18 gsm from Foshan Landi) and a non-woven hydrophilic fabric sheet (Hot air non-woven fabric 2AT-25 with a thickness of 25 gsm from Nanliu Corporation) were adhered together to form a laminate sample by applying the hot melt adhesive between the two sheets at 2 gsm via Signature nozzle head between 130 to 160° C. The PE sheet and the non-woven hydrophilic fabric sheet were peeled from one another at an angle of 180° and with a rate of 300 mm/min using Instron 3365 tensile strength tester. The T peel test was carried out at 25° C. and 50% relative humidity. The T peel test was made to the laminate sample at least 72 hours after the hot melt adhesive was applied. The PE sheet and the non-woven hydrophilic fabric sheet were pulled 10 cm apart and the force was recorded as the T peel strength of the hot melt adhesive for adhering PE and non-woven hydrophilic fabric.

T Peel Test with PE and Non-Woven Hydrophobic Fabric

A PE sheet (Air permeable cast film with a thickness of 18 gsm from Foshan Landi) and a non-woven hydrophobic fabric sheet (SS non-woven fabric with a thickness of 15 gsm from JOFO Nonwoven Ltd.) were adhered together to form a laminate sample by applying the hot melt adhesive between the two sheets at 2 gsm via Signature nozzle head between 130 to 160° C. The PE sheet and the non-woven hydrophobic fabric sheet were peeled from one another at an angle of 180° and with a rate of 300 mm/min using Instron 3365 tensile strength tester. The T peel test was carried out at 25° C. and 50% relative humidity. The T peel test was made to the laminate sample at least 72 hours after the hot melt adhesive was applied. The PE sheet and the non-woven hydrophobic fabric sheet were pulled 10 cm apart and the force was recorded as the T peel strength of the hot melt adhesive for adhering PE and non-woven hydrophobic fabric.

T Peel Test with Non-Woven Hydrophilic Fabric and Non-Woven Hydrophobic Fabric

A non-woven hydrophilic fabric sheet (Hot air non-woven fabric 2AT-25 with a thickness of 25 gsm from Nanliu Corporation) and a non-woven hydrophobic fabric sheet (SS non-woven fabric with a thickness of 15 gsm from JOFO Nonwoven Ltd.) were adhered together to form a laminate sample by applying the hot melt adhesive between the two sheets at 4 gsm via Signature nozzle head between 130 to 160° C. The non-woven hydrophilic fabric sheet and the non-woven hydrophobic fabric sheet were peeled from one another at an angle of 180° and with a rate of 300 mm/min using Instron 3365 tensile strength tester. The T peel test was carried out at 25° C. and 50% relative humidity. The T peel test was made to the laminate sample at least 72 hours after the hot melt adhesive was applied. The non-woven hydrophilic fabric sheet and the non-woven hydrophobic fabric sheet were pulled 10 cm apart and the force was recorded as the T peel strength of the hot melt adhesive for adhering non-woven hydrophilic fabric and non-woven hydrophobic fabric.

T Peel Test with PE and Tissue

A PE sheet (Air permeable cast film with a thickness of 18 gsm from Foshan Landi) and a tissue (cellulose tissue with a thickness of 18 gsm from Zhongzhi) were adhered together to form a laminate sample by applying the hot melt adhesive between the two sheets at 1.5 gsm via Signature nozzle head between 130 to 160° C. The PE sheet and the tissue were peeled from one another at an angle of 180° and with a rate of 300 mm/min using Instron 3365 tensile strength tester. The T peel test was carried out at 25° C. and 50% relative humidity. The T peel test was made to the laminate sample at least 72 hours after the hot melt adhesive was applied. The PE sheet and the tissue were pulled 10 cm apart and the force was recorded as the T peel strength of the hot melt adhesive for PE and tissue.

Example 1-7

Hot melt adhesive composition samples were prepared, according to Table 1, by mixing the components selected from:

mineral oil (KN 4010 from PetroChina Lubricant Company);

pentaerythritol tetrakis (3-(3,5-di-tert-butyl-4-hydroxyphenyl)propionate) (Evernox 10GF from Everspring Chemical);

tris (2,4-di-tert-butylphenyl) phosphite (Everfos 168GF from Everspring Chemical); wax (Sasaolwax H1 from Sasol Wax);

SEBS with a melt index in a range of 30 to 46 g/10 min at 190° C./2.16 kg (MD 1648 from Kraton);

propylene-based olefin polymer with a melt viscosity of 1700 cPs at 190° C. (Aerafin 17 from Eastman);

hydrogenated aliphatic petroleum resin (H5-1000 from Henghe);

propylene and ethylene based polyolefin copolymer with a melt viscosity of 3980 cPs at 190° C. (Vistamaxx 8780 from ExxonMobil Chemical);

copolymer of ethylene and 1-octene with a melt viscosity of 5500 cPs at 190° C. (Affinity 1900 from Dow); and SEBS with a melt index smaller than 1 g/10 min at 190° C./2.16 kg (G1657 from Kraton).

Example 8-9

Example 8 is a SIS based adhesive, commercially available from Henkel under the trade name of DM2855;

Example 9 is a SBS based adhesive, commercially available from Henkel under the trade name of DMC1101.

TABLE 1

Hot melt adhesive composition

| | Weight % | | | | | | |
|---|---|---|---|---|---|---|---|
| Components | Example 1 | Example 2 | Example 3 | Example 4 | Example 5 | Example 6 | Example 7 |
| KN 4010 | 12 | 10 | 10 | 10 | 10 | 10 | 10 |
| Evernox 10GF | 0.5 | 0.5 | 0.5 | 0.5 | 0.5 | 0.5 | 0.5 |
| Everfos 168GF | 0.5 | 0.5 | 0.5 | 0.5 | 0.5 | 0.5 | 0.5 |
| Sasaolwax H1 | 2 | 1 | | 1 | 1 | 1 | 1 |

TABLE 1-continued

Hot melt adhesive composition

Weight %

| Components | Example 1 | Example 2 | Example 3 | Example 4 | Example 5 | Example 6 | Example 7 |
|---|---|---|---|---|---|---|---|
| MD1648 | 10 | 10 | 10 | 15 | 10 | 10 | |
| G1657 | | | | | | | 10 |
| Aerafin 17 | 30 | 33 | 34 | 28 | | | 33 |
| Vistamaxx 8780 | | | | | | 33 | |
| Affinity 1900 | | | | | 33 | | |
| H5-1000 | 45 | 45 | 45 | 45 | 45 | 45 | 45 |

In Table 2A and Table 2B, the melt viscosity of the hot melt adhesive samples is reported. In order to coat the hot melt adhesive properly onto the substrates, the melt viscosity of the hot melt adhesive usually is required to be less than or equal to 3000 cPs. Therefore, the hot melt adhesive samples in Example 1 to 4 can all be applied at the temperature of 140° C.

When polyolefin with a melt viscosity greater than 2000 cPs at 190° C. were used in the hot melt adhesive samples as in Example 5 and 6, the melt viscosity of the hot melt adhesive samples increased to over 3000 cPs at the temperature of 140° C. Therefore, the hot melt adhesive samples in Example 5 and 6 cannot be properly applied at the temperature of 140° C.

When SEBS with a melt index less than 30 g/10 min at 190° C./2.16 kg was used in the hot melt adhesive sample as in Example 7, the melt viscosity of the hot melt adhesive sample increased greatly at the temperature of 140° C. Therefore, the hot melt adhesive sample in Example 7 cannot be properly applied at the temperature of 140° C.

The melt viscosity of the SIS or SBS based adhesive sample in Example 8 or 9 was also high at the temperature of 140° C. Therefore, the hot melt adhesive samples in Example 8 and 9 cannot be properly applied at the temperature 140° C.

When the weight ratio between the hydrogenated thermoplastic block copolymer and the polyolefin was less than 0.6:1, the melt viscosity of the hot melt adhesive samples in Example 1 to 4 was less than 3000 cPs at 140° C. It was further found that when the weight ratio between the hydrogenated thermoplastic block copolymer and the polyolefin was in the range of 0.33:1 to 0.4:1, the melt viscosity of the hot melt adhesive sample was lower than 3000 cPs at the temperature of 130° C. as shown in Example 1. Therefore, the hot melt adhesive sample in Example 1 can even be applied at the temperature of 130° C.

TABLE 2 A

Melt viscosity of hot melt adhesive

| Viscosity (cPs) | Example 1 | Example 2 | Example 3 | Example 4 | Example 5 | Example 6 |
|---|---|---|---|---|---|---|
| 140° C. | 1830 | 2280 | 2600 | 2770 | 4370 | 4080 |
| 130° C. | 2750 | 3480 | 4000 | 4100 | 6660 | 6280 |

TABLE 2 B

Melt viscosity of hot melt adhesive

| Viscosity (cPs) | Example 7 | Example 8 | Example 9 |
|---|---|---|---|
| 140° C. | 6760 | 4400 | 3300 |
| 130° C. | 11300 | 6700 | 4700 |

In Table 3, the odor scores of the hot melt adhesive samples are reported. It was shown that SEBS based adhesive samples in Example 1 to 4 had better odor score compared with the SIS or SBS based adhesive sample in Example 8 or 9.

TABLE 3

Odor score of hot melt adhesive

| | Example 1 | Example 2 | Example 3 | Example 4 | Example 8 | Example 9 |
|---|---|---|---|---|---|---|
| Odor score | 2.15 | 2.13 | 2.1 | 2.1 | 2.33 | 2.5 |

In Table 4, the T peel strength of the hot melt adhesive samples is reported. In order to coat the hot melt adhesive samples to the substrates of the laminate samples properly, the hot melt adhesive samples in Example 2, 4, 8 and 9 were applied at the temperature of 135° C., 140° C., 155° C. and 150° C. respectively. It was shown that the SEBS based adhesive samples in Example 2 and 4 have better T peel strength than the SIS or SBS based adhesive sample in Example 8 or 9. It was also found that when the weight ratio between the hydrogenated thermoplastic block copolymer and the polyolefin was in the range of 0.3:1 to 0.4:1, the T peel strength of the hot melt adhesive was even further improved as shown in Example 2.

TABLE 4

| T peel strength | Example 2 | Example 4 | Example 8 | Example 9 |
|---|---|---|---|---|
| PE/non-woven hydrophilic fabric (N) | 3.62 | 2.78 | 2.61 | 2.11 |
| PE/non-woven hydrophobic fabric (N) | 3.39 | 2.71 | 2.7 | 2.25 |
| Non-woven hydrophilic fabric/non-woven hydrophobic fabric (N) | 6.55 | 5.89 | 4.68 | 3.99 |
| PE/tissue (N) | 2.1 | 1.85 | 1.79 | 1.54 |

The invention claimed is:

1. A hot melt adhesive composition comprising:
    (a) 10 to 15 wt %, based on the total weight of the hot melt adhesive, of a styrene-ethylene-butylene-styrene (SEBS) block copolymer with a melt index greater than or equal to 30 g/10 min at 190° C./2.16 kg; and
    (b) 25 to 35 wt %, based on the total weight of the hot melt adhesive, at least one polyolefin with a melt viscosity less than or equal to 2000 cps at 190° C.
    wherein the hot melt adhesive composition has a viscosity less than or equal to 3000 cPs at 140° C.; and
    wherein the hot melt adhesive composition has an odor score less than 2.3.

2. The hot melt adhesive composition according to claim 1, wherein the polyolefin is selected from at least one of polyethylene, polypropylene, polybutene, and the copolymers and terpolymers thereof.

3. The hot melt adhesive composition according to claim 1, wherein the weight ratio between the SEBS block copolymer and the polyolefin is less than or equal to 0.6:1.

4. The hot melt adhesive composition according to claim 1, further comprising wax, tackifier, antioxidant, pigment, rheology modifier or filler.

5. The hot melt adhesive composition according to claim 1, comprising:
    (a) from 10 to 15% by weight of a styrene-ethylene-butylene-styrene (SEBS) block copolymer with a melt index greater than or equal to 30 g/10 min at 190° C./2.16 kg;
    (b) from 25 to 35° by weight of at least one polyolefin with a melt viscosity less than or equal to 2000 cps at 190° C.;
    (c) from 5 to 35% by weight of at least one plasticizer;
    (d) from 20 to 60% by weight of at least one tackifier; and
    (e) from 0.1 to 2% by weight of at least one antioxidant;
    wherein the weight percentages of all components add up to 100% by weight; and
    wherein the hot melt adhesive composition has a viscosity less than or equal to 3000 cPs at 140° C.

6. An article comprising a substrate bonded to the hot melt adhesive composition according to claim 1, wherein the substrate is selected from the group consisting of a woven fabric, a nonwoven fabric, a rubber, a resin, tissues, polyolefin films, elastic films and elastic strands.

7. The article of claim 6, wherein the article is a disposal product.

8. The article of claim 6, wherein the article is a baby diaper, a sanitary napkin, a pet sheet, a hospital gown or surgical garment.

9. The hot melt adhesive composition according to claim 1, wherein the hot melt adhesive composition has a viscosity less than or equal to 3000 cPs at 130° C.

10. The hot melt adhesive composition according to claim 5, wherein the hot melt adhesive composition has a viscosity less than or equal to 3000 cPs at 130° C.

* * * * *